April 23, 1963   F. J. GARDINER ETAL   3,086,697
ROTOR DESIGN FOR AERO-DYNAMIC WAVE MACHINE
Filed May 12, 1958   3 Sheets-Sheet 3
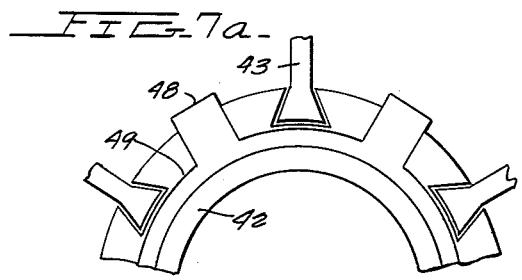
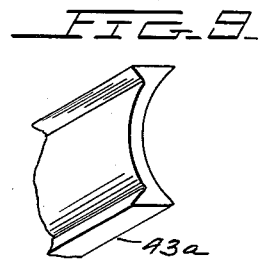
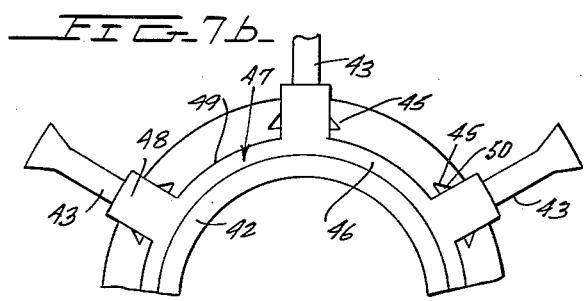
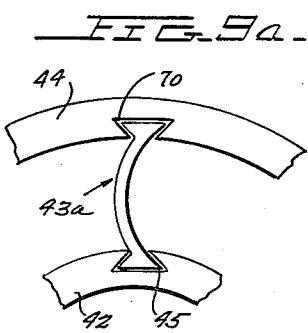
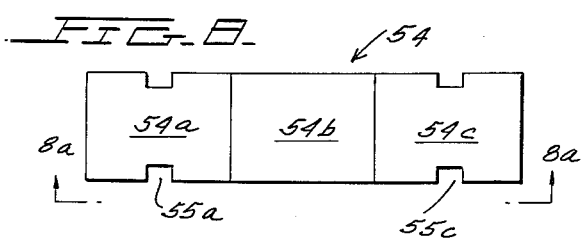
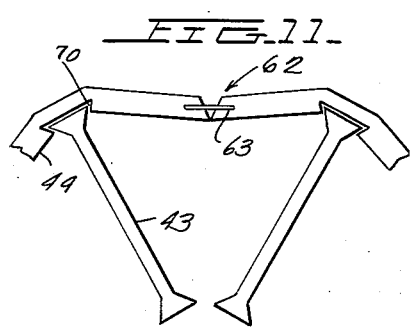
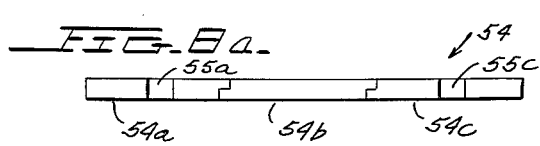
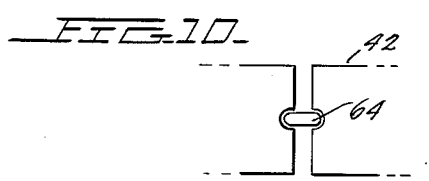
INVENTORS
FRANK J. GARDINER
MAX BERCHTOLD
BY
ATTORNEYS

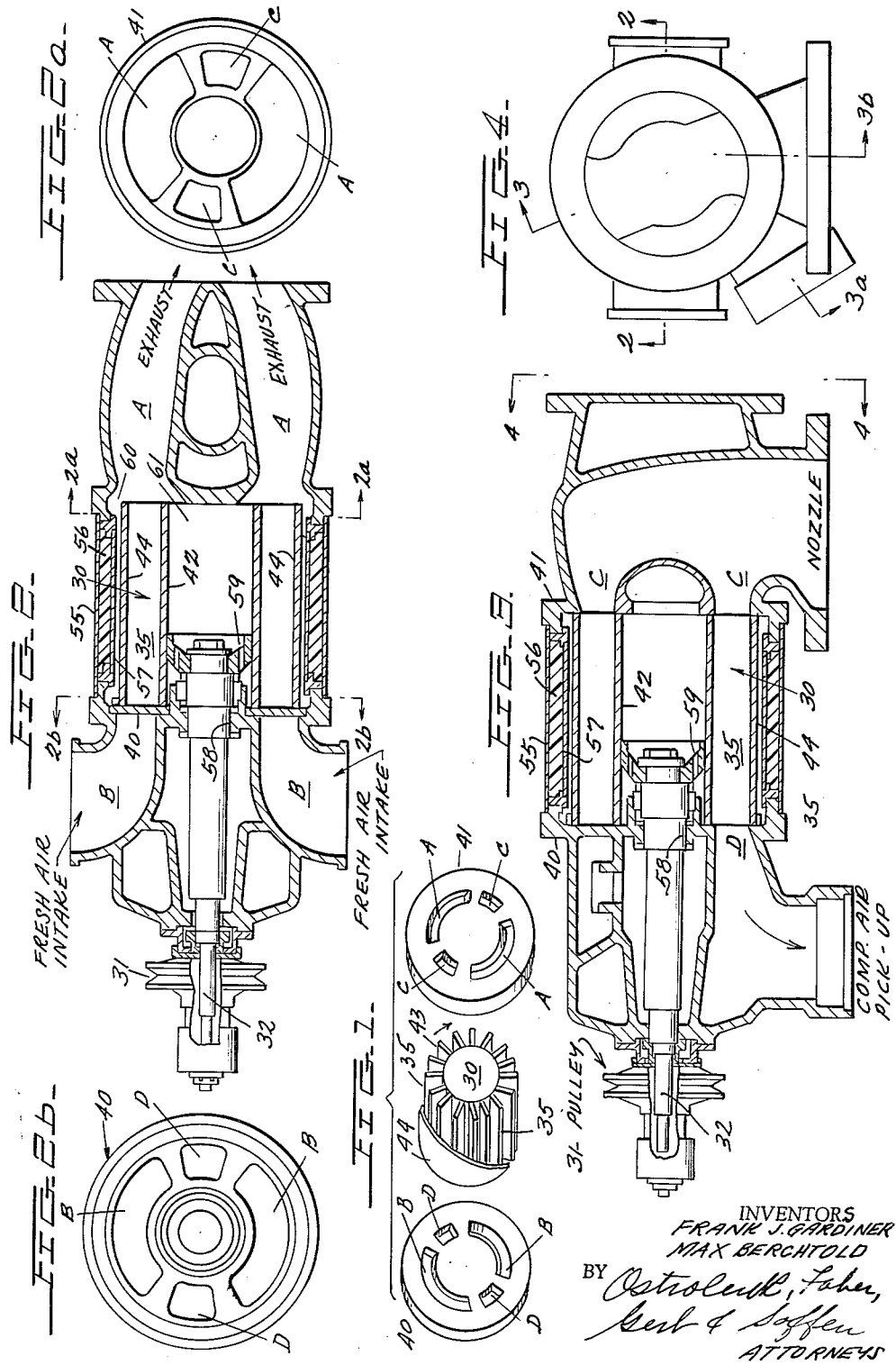

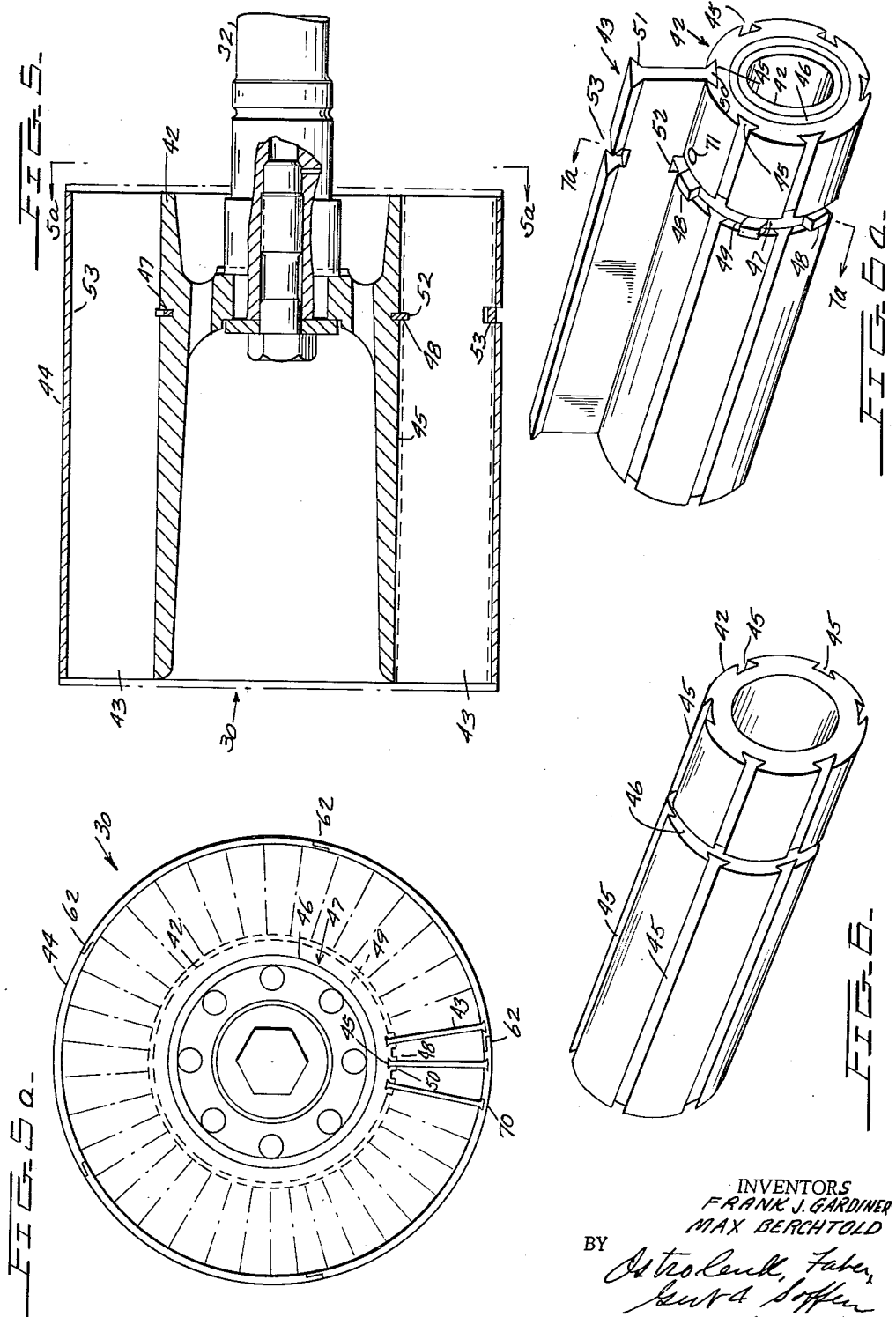

United States Patent Office 3,086,697
Patented Apr. 23, 1963

3,086,697
ROTOR DESIGN FOR AERO-DYNAMIC WAVE MACHINE
Frank J. Gardiner, Bryn Mawr, and Max Berchtold, Paoli, Pa., assignors to I-T-E Circuit Breaker Company, Philadelphia, Pa., a corporation of Pennsylvania
Filed May 12, 1958, Ser. No. 734,732
3 Claims. (Cl. 230—69)

Our invention relates to a design for an aero-dynamic wave machine, and more particularly is directed to a rotor design wherein the construction allows for differential expansion of the various components without resulting in permanent deformation of the components.

In many types of rotating equipment it is necessary to provide a plurality of blades extending from a rotor. A particular example of this is in aero-dynamic wave machines of the type described and illustrated in copending applications Serial No. 454,774, filed September 8, 1954, entitled Wave Machine, by Max Berchtold, issued February 7, 1961, as U.S. Patent 2,970,745; Serial No. 415,899, filed March 12, 1954, entitled Aero-Dynamic Wave Machine Super-Charger for Steam Generators, issued September 30, 1958, as U.S. Patent 2,853,979; Serial No. 637,570, filed January 31, 1957, entitled Reverse Cycle Aerodynamic Wave Engine, by Max Berchtold; and U.S. Patent 2,828,103, issued March 25, 1958, to M. Berchtold, all assigned to the assignee of the instant invention. In this type of installation it is necessary to form a plurality of channels around a hub to guide the passage of fluids having great variation in temperature and pressure. Since these rotating devices operate at high r.p.m. of the order of 7000 r.p.m., it is essential to provide securing means for the blades forming the channels so that the blades cannot only withstand the large centrifugal force exerted thereof, but also at the same time permit the blades to expand and contract with the large variations in temperatures to which they are exposed without distorting.

In the prior art arrangement the means by which the blades were secured to the hub necessitated either extremely complex constructions which resulted in both an inconvenient construction as well as a unit which was difficult to manufacture. Many also had the disadvantage of securing the blades so that they were not capable of sufficient expansion and contraction and thus resulted in the warping and breaking of the blades. With all embodiments of our invention, the disadvantages of the prior art are overcome.

Rotor designs are comprised of a hub, blades and shroud. The thin-walled hub has a plurality of straight dove-tail or reentrant grooves into which the blades of matching shape are inserted. Similar dovetail joints are used where the blade connects to the shroud. If the rotor is used in an aero-dynamic wave machine with a reversed cycle, for instance, to supercharge an internal combustion engine the temperature distribution between the hot end and the cold end is approximately linear. Hence, the original cylindrical shape of the hub can become conical. It is therefore important that the hot end is free to expand. A cantilever shaft arrangement, whereby the shaft is attached to the rotor hub near the cold end, presents the most desirable solution. The cantilever shaft furthermore offers the advantage that the bearings can be placed in the same casting or housing which permits better alignment of the bearings. The blades and shroud, being thinner than the hub, follow temperature changes faster than the hub. Thus, it is necessary to have a structure which is flexible to thermal expansion without permanent distortion. To this end our rotor design provides a shroud made in segments with overlapping joints for sealing the fluid within the channels. The blades are held axially in a groove at only one point and hence although secured radially by means of the dovetail joint can expand in the axial direction independently of the expansion of the hub. The shroud segments are secured to the blades axially in the same plane. With our novel design the rotor of our invention does not have any deformation due to thermal stresses and is simple to produce.

Basically our invention provides a design wherein all components of the rotor can move relatively to each other to permit thermal expansion of each part. The movement of the parts is restrained at one definite point. Thus, although the hub, blades and shroud of the rotor all have differential expansion they will not distort permanently and will return to their original configuration. Thus, even though all parts may have a different coefficient of expansion, or have a different degree of expansion due to configuration, these parts will not be permanently distorted since they are only secured relatively to each other at one point, and hence have free expansion and contraction.

In one embodiment we provide a plurality of reentrant or dovetail grooves extending axially in the outer periphery of the hub. The blades are constructed with their outer edges having a dovetail construction which can be received and captured within the axially extending dovetail grooves within the hub. A second groove, in the outer periphery of the hub, and extending circumferentially around the hub, is provided to receive a lockring having a plurality of extensions which are angularly spaced a distance equal to the angular spacing of the dovetailed axially extending grooves.

As an example of a lockring device, each of the blades is provided with a cut-away section which is in alignment with the circumferentially positioned groove when the blade is properly positioned on the hub. Thereafter, the lockring is rotated so that each extension thereon mates with its respective groove in its respective blade. Thus, the axially extending dovetailed groove in the hub positions the blade to prevent movement in a radial direction and the extensions on the lockring hold the blade against movement in an axial direction. However, since the blade, by this novel arrangement, is secured in only one position the blade is free to expand and contract in an axial direction without warping or distorting.

Accordingly, a primary object of our invention is to provide a novel arrangement whereby a plurality of blades which are subjected to large centrifugal forces and variations in temperature are simply and economically secured in place in a manner to both readily withstand the large centrifugal forces and still permit adequate expansion and contraction without distorting the blades.

Another object of our invention is to provide a novel arrangement comprised of a novel lockring arrangement positioned circumferentially around a hub whereby protrusions thereon key into recesses in the blade after the blades have been positioned.

In a cell rotor construction for an aero-dynamic wave machine it has been found best to cantilever the entire structure of the cell rotor so that the cold end of the rotor is supported and the hot end of the rotor is at the free end. With this arrangement there is an extreme temperature gradient between the ends of the rotor, and hence it is necessary to provide complete free expansion of related parts like the hub, blade and shroud.

Thus, the thermal stress limitations require that the blades, the rotor, hub and shroud be free to expand and contract axially relative to each other and that the shroud and hub be free to expand circumferentially relative to each other.

To this end, the wedge root construction of the axially extending grooves to hold the plurality of blades is such that the blades, although held in position at a single point are sufficiently loose within the grooves to permit axial movement on both sides of the lockring or similar means serving this purpose.

Even though the axial temperature distribution is approximately linear, it is possible for the rotor hub to become slightly trumpet shaped rather than conical. In this case it is desirable to have a small degree of radial freedom in the grooves so that each blade can remain straight.

Also, in order to facilitate axial expansion of the blades they may be made in sections, i.e. axially split. Furthermore, the shroud which is positioned on the outer circumference of the cell rotor to form a wall of the cells formed by the blades, is discontinuous in that it is made of a plurality of sections along an axial line to permit radial movement and allow radial expansion of the blades. The sections of the shroud are built with an overlap to provide a sealing means to prevent escape of fluids from the cells.

Each of the plurality of blades is constructed with a single small recess in the edge positioned in the outer periphery of the cell rotor. Thus, the shroud is secured to the blades by merely upsetting a portion of its metal into the recess or notch of the blade. Thus, in effect, the shroud is only secured at one point in the same manner that the blades are secured at only one point to the hub.

Accordingly, an object of our invention is to provide a novel structure for a cell rotor arrangement in which there is free expansion of relative parts.

Another object of our invention is to provide a cell rotor construction in which the blades, rotor hub, and shroud are free to expand in an axial direction relative to each other and in which the shroud and hub are free to expand circumferentially relative to each other.

These and other objects of our invention will be apparent when taken in connection with the drawings in which:

FIGURE 1 is a schematic perspective view showing a rotor and its ports, and particularly illustrating the plurality of blades to which our novel invention can be applied.

FIGURE 2 is a cross-sectional view of a rotor and stator of an aero-dynamic wave machine which is taken in the direction of the arrows 2—2 of FIGURE 4. This figure illustrates a typical aero-dynamic wave machine to which our invention can be applied.

FIGURE 2a is a view taken in the direction of the arrows 2a—2a of FIGURE 2 and illustrates one stator plate.

FIGURE 2b is a view taken in the direction of the arrows 2b—2b of FIGURE 2 and illustrates the other stator plate.

FIGURE 3 is another cross-sectional view of the rotor and stator plates similar to that of FIGURE 2, the left portion of which is taken in the direction of the arrows 3a—3a of FIGURE 4 and the right portion of which is taken in the direction of the arrows 3b—3b of FIGURE 4.

FIGURE 4 is an end view taken in the direction of the arrows 4—4 of FIGURE 3.

FIGURE 5 is a cross-sectional view of a rotor and illustrates the manner in which the blades are secured against the axial movement at a single point by means of a lockring.

FIGURE 5a is an end view taken in the direction of the arrows 5a—5a of FIGURE 5.

FIGURE 6 is a schematic perspective view of the hub of FIGURE 5 illustrating the plurality of axially extending dovetail grooves to receive the blade as well as the single circumferentially extending groove which receives the lockring.

FIGURE 6a is a schematic perspective view of the hub similar to FIGURE 6 illustrating how one blade is positioned within the axially extending groove before the lockring is rotated to prevent the axial movement of the blade.

FIGURE 7a is a cross-sectional view taken in the direction of the arrows 7a—7a of FIGURE 6a and illustrates the plurality of blades positioned within the axially extending dovetail grooves prior to the time that the lockring is rotated to lock the blades against axial movement.

FIGURE 7b is a view similar to FIGURE 7a but illustrates the position of the parts after the lockring has been rotated to lock the plurality of blades against axial movement.

FIGURE 8 illustrates a modified arrangement for the blades wherein the blades are made in sections.

FIGURE 8a is a view taken in the direction of the arrows 8a—8a of FIGURE 8.

FIGURE 9 is a perspective view of one blade illustrating one end thereof curved to provide turbine action for the cell rotor.

FIGURE 9a is a side view of the hub, shroud, and blade illustrating the curved blade arrangement of FIGURE 9.

FIGURE 10 is a side cross-sectional view of the hub illustrating the manner in which the hub can be made in segments and still provide adequate sealing means.

FIGURE 11 is a side cross-sectional view of the shroud and illustrates the configuration and construction which permits thermal expansion while maintaining proper sealing.

Referring first to FIGURES 1–4, the rotor 30 is driven for rapid rotation about its axis in any suitable manner as by a belt drive over pulley 31 to the rotor shaft 32. The rotor 30 is a drum having an outer shell or shroud 44 and a plurality of cells 35 extending more or less parallel to the axis of the rotor adjacent the periphery thereof.

Two stators 40 and 41 are placed on opposite sides of the rotor 30 in the closest possible proximity thereto consistent with the high-speed rotation required in the rotor 30 to obtain the best possible gas tight seal. The stator 41 on the right side of the rotor 30 is provided with nozzle C for the input of a first gas at elevated pressure and an exhaust port A for exhausting the first gas at approximately ambient pressure.

Stator 40 on the left side of the rotor 30 is provided with pick-up port D for the output of a second gas at elevated pressure and air intake port B for the intake of the second gas at ambient pressure.

Since all of the hot gases are confined to stator 40 and the cold gas to the other stator 41, a cantilever rotor arrangement can be used to advantage in this reverse cycle system since there need not be a bearing on the hot side and hence hot bearing trouble can be eliminated. Also, the cold stator 41 can be cast from a light alloy such as aluminum magnesium since it will not have to withstand high temperatures. It should be noted that although thermal stresses are substantially reduced or eliminated in the stator of a reverse cycle device, there are nevertheless extreme thermal temperature differentials in the rotor 30. It is therefore necessary to have a degree of flexibility at the hot end of the rotor 30. The cantilever shaft arrangement allows the hot end of the rotor to expand without causing excessive thermal stresses.

The rotor 30 is rotated at the speed which produces the required timing for the waves of the interfaces with respect to the ports B, D and A, C in the stator plates 40 and 41 respectively. The individual cells of the rotor 30 move successively past opposite ports D and C and then B and A. Hot and cold fluids will be introduced into the channels 35 of the rotor 30. Although the blades 43 may reach an average temperature after the machine is operating, the blades 43 are nevertheless subjected to a large temperature change from starting to normal operating conditions and hence it is necessary to provide for their expansion without warping or buckling during transient conditions.

The rotor 30 is comprised of a hub 42, a plurality of rotor blades 43, and a rotor outer shroud 44. As best seen in the perspective view of FIGURE 6, the hub 42 has a plurality of axially extending grooves 45 which extend from one end of the rotor to the other end. Each of the plurality of axially extending grooves 45 has a dovetail configuration and is adapted to receive a blade having a similar configuration at the end position and secured therein.

One method of securing the blades 43 to the hub 42 is by means of a lockring. When this arrangement is used the hub 42 is provided in its outer periphery with a circumferentially extending slot 46 which as seen in the cross-sectional views of FIGURES 7a and 7b, is deeper than the plurality of axially extending grooves 45.

The circumferentially extending groove 46 is adapted to receive a lockring 47. The lockring 47 may be constructed in two sections to facilitate its assembly and positioning on the hub 42. The lockring 47 has a plurality of extensions 48 extending radially therefrom and positioned from each other by an angular distance which is equal to the angular distance between adjacent axial grooves 45. Thus, for example, in the schematic illustration of FIGURES 6 and 7 there are six axially extending grooves 45 which are displaced by an angular distance of 60° from each other and therefore the protrusions 48 would be displaced from each other by an equal angular distance of 60°.

In the illustration of FIGURES 5 and 5a there are 36 blades to be positioned on the hub 42 and these blades are displaced an angular distance of 10° from each other and therefore the protrusions 48 would in turn be displaced from each other by an equal amount, namely 10°.

As heretofore noted, the circumferentially extending groove 46 is deeper than the axially extending groove 45 so that when the lockring 47 is positioned within the circumferentially extending groove 46 the main portion 49, extending between the extensions 48, will be below the bottom surface of the axially extending groove 45.

Therefore, after the lockring 47 is positioned within its circumferentially extending groove 46 it will be possible to move the plurality of blades 43 into their respective axially extending grooves 45 without interference from the lockring 47 such as illustrated in FIGURES 6a and 7a.

As previously noted, each of blades 43 has a dovetail configuration 50, 51 along the edges extending in an axial direction. Hence, the blade 43 is captured within the axially extending groove 45 against radial movement due to the interlocking action between the dovetail configuration of the axially extending slot 45 and dovetail edge 50 of the blade 43. The blade 43 is also provided with two openings 52 and 53 in the edges 50 and 51 respectively. The opening 52 extends radially outward a distance slightly greater than the protrusions 48 on the lockring 47 and is therefore adapted to receive the extension 48 when the lockring 47 is rotated. That is, when the blade 43 is properly positioned in an axial direction within the axially extending groove 45, the opening 52 will be in alignment with the circumferentially extending groove 47 as seen in FIGURE 6a.

The relationship of the lockring 47 to the axially extending slot 45 and blades 43 at this time is best illustrated in FIGURE 7a. In FIGURE 7a the plurality of blades have been positioned within their respective axially extending grooves 45 with the lockring 47 in the position illustrated in FIGURE 6a. Thus, if the plurality of blades 43 are positioned within their respective grooves 45, they are as heretofore noted, restrained from radial movement but are not restrained from axial movement. However, with our novel arrangement, the blades 43 are each restrained from axial movement by merely rotating the lockring 47 so that the protrusions 48 key into the openings 52 of the blade 43 such as illustrated in FIGURES 5a and 7b. Thus, by merely rotating the lockring 47 in an angular direction the plurality of protrusions 48 will key into the openings 52 to thereby provide one point of locking for the blades 43 to thereby prevent their movement in an axial direction.

Thus, with our novel arrangement a relatively simple and economical construction is provided wherein the blades are locked against both axial and radial movement and since lockring 47 only keys with one point of the blade 43, the blade 43 is free to expand in an axial direction when subjected to large temperature variations.

As heretofore noted, the structure for the cell rotor 30 is subjected to extreme temperature gradients between the ends when it is used in the reverse cycle arrangement seen in FIGURES 2 and 3 wherein the supported end adjacent the stator plate 40 is cold and the free end adjacent the stator plate 41 is hot. If adequate means are not provided to permit complete free expansion of the relative parts such as the shroud 44, blades 43, and hub 42, the cell rotor 30, in the event of a non-linear distribution of temperature along the axis thereof, would tend to assume a trumpet like shape in that all of the parts could not have free expansion axially, thereby resulting in the hot end expanding radially outward.

The blades 43 are secured within the wedge root axially extending slots 45 but are loose therein and are free to expand both axially and radially since they are only secured at one point. It is desirable to insure free expansion of not only related parts, such as the hub 42 and blades 43, but also desirable to permit free expansion of the shroud 44. To this end each of the blades 43 is provided with a detent or notch 53 such as seen in FIGURES 5 and 6a. The shroud 44 is provided with a plurality of circumferentially spaced reentrant grooves 70 on the inner surface similar to the reentrant grooves 45 in the hub 42. Thus, when the shroud 44 is fitted around the outer circumference of the plurality of blades 43 such as seen in FIGURES 5 and 5a, it can be secured at one point to the blades 43 by upsetting the metal of the shroud 44 into the recess 53.

Thus, as seen in FIGURE 5, the top portion of the shroud 44 illustrates the condition prior to the time it is secured to the blades 43, and the lower portion of the shroud 44 illustrates the configuration after it is secured to the blades 43.

Thus, the blades 43 are secured to the shroud 44 on only one point and hence the parts will be free to expand without permanent deformation.

It should be noted that the means by which the blades 43 are secured to the shroud 44, namely by upsetting the metal, can also be used to secure the lockring 47 to the hub 42. Thus, as seen in FIGURE 6a a hole 71 is drilled in the hub 42 and the metal is upset against the lockring 47. Thus, the lockring 47 is secured to the hub 42 at only one point and hence the parts are free for thermal expansion without permanent deformation.

An alternative system of locking the blades 43 against axial movement at a single point along the axial groove is to replace the lockring 48 by the locking method similar to the one described above for the axial locking between the blades 43 and the shroud 44. For this purpose the circumferential groove 46 which previously located the lockring 47 is eliminated, a circumferential groove is machined on the inside of the hub 42, so that the remaining wall thickness at the grooves permits upsetting the metal identically to the upsetting of the shroud 44 metal into the recess of the blade 52.

The shroud 44 in effect is secured along only one circumferential line and thereby has free axial movement relative to the blades 43. However, it is also necessary to permit free circumferential and radial expansion of the shroud 44 and to this end the shroud 44 is sectionalized along an axial line such as illustrated in FIGURE 5a. The sections of the shroud are preferably constructed to overlap at 62 so as to provide a sealing means and prevent fluid from escaping from the cells formed by the hub 42, blades 43, and shroud 44.

A detailed view of the construction which can be used for the shroud 44 at the overlap point 62 is illustrated in FIGURE 11. If the axial sections of the shroud 44 are overlapped as illustrated in FIGURE 5a the centrifugal force may act on the overlap section 62 to open up this section and weaken or disengage reentrant groove 70 from the blades 43. This would cause both distention of the parts and also cause leakage of fluid from the cells 35. However, if the overlap section 62 of the shroud 44 is made concave inwardly as illustrated in FIGURE 11 so that the straight line distance between adjacent blades 43 is less than the length of the metal between the blades, the arrangement will prevent bulging out so that thermal expansion will merely result in bulging inwardly. The axial sections of the shroud 44 are grooved axially along their sides to slidably receive a connecting member 63 as illustrated in FIGURE 11. The member 63 serves as a seal both at ambient temperatures and at a time when the components are exposed to thermal expansion.

Thus, with our novel arrangement there is a controlled positioning and expansion of the hub, blades 43, and shroud 44 so that when these components expand they will have relative motion.

Since in some applications of the cell rotor, the device will be caused to rotate 7000 r.p.m. and be subjected to gas temperatures of the order of 1600° Fahrenheit, it may be necessary to provide additional means to insure complete free expansion of related parts. To this end we have provided a modified arrangement such as illustrated in FIGURE 8 wherein each of the blades 43 is constructed in sections. Thus, as seen in FIGURE 8, the blade 54 is comprised of sections 54a, 54b, and 54c, so as to completely insure free expansion in an axial direction.

It will be noted that with this arrangement it will be necessary to secure both of the outer sections 54a and 54c with a separate lockring or upsetting the metal and thus a notch or recess 55a, 55c respectively, is provided for the sections.

As seen in FIGURE 8a, which is an end view of the blade 54 of FIGURE 8, the sections are built with overlap to provide a seal to prevent fluids from escaping from one channel to another.

It will be noted that the similar results could also be achieved by modifying the hub 42 instead of the blades. Thus with said blade 43 the hub 42 could be made in sections with a pin 64 positioned within grooves on the side of the hub as illustrated in the cross-sectional view of FIGURE 10.

With our novel arrangement the cell rotor structure can be used in connection with the invention shown in U.S. Patent 2,828,103, issued March 25, 1958, to M. Berchtold and assigned to the assignee of the instant invention, in which a turbine action is created within the cell rotor 30. That is, the design can be used with a slight curvature of the blade on either end to reduce the driving power required for the cell rotor. In this arrangement the edges of the blades remain straight and parallel to each other but a portion of the blade existing between the edges and at one end is curved outwardly such as illustrated in FIGURES 9 and 9a.

The components of the rotor, such as hub 42, blades 43, and shroud 44, are thus all constructed and assembled so that each component is secured either at only one point or along only one line to permit free thermal expansion while retaining an integral rotor design to withstand severe centrifugal forces. Thus, although the various components are exposed to different temperatures, thus resulting in differential expansion, the entire rotor structure will always return to the original configuration.

As heretofore noted, the aero-dynamic wave machine to which our invention is particularly adapted is exposed to gas temperatures of the order of 1600° F. Even though the rotor is exposed to both hot gas and cold air there is a substantial axial expansion of the rotor 30. Since the operation and the efficiency of the aero-dynamic wave machine, particularly if it is used to supercharge an internal combustion engine, depends on the clearances between the rotors and the stators, it is essential to maintain these clearances as small as possible at all steady state and transient conditions.

The rotor housing 57, which controls the distance between the stators, has to have a temperature substantially equal to the rotor 30. Furthermore, during transient conditions the temperature of the housing 57 has to change as fast as the rotor 30 so that there will be no rubbing between the stators 40 and 41 and the rotor 30. If the rotor housing 57 is built of light gage material and if the outside is insulated by the insulator 56 and the shield 55, the entire heat influx remains in the housing and the most rapid temperature adaptation of the rotor housing 57 to the rotor 30 can be expected.

The clearance between the rotor 30 and the cold stator 40 is controlled by a thrust bearing 58 located near the face of the stator 40, so that the thermal expansion of the stator and the rotor has a small effect to the cold stator-rotor clearance.

In order to further secure more immediate temperature changes of the rotor housing 57, the compressed air which leaks from the pick-up ports D, FIGURE 2b, is ducted through the annular space between the housing 57 and the rotor shroud 44 into the exhaust port A. Since the temperature of the compressed air is approximately equal to the desired rotor temperature, this becomes a simple, responsive system. The same means can be used to assure rapid temperature change of the relatively heavy rotor hub to assure minimum clearances between the rotor hub 42 and the stators 40 and 41. For this purpose these are axial passages 59 through the shaft connection so that the leakage air escaping from the pick-up port D to the inside of the rotor 30 can pass through the inside of the hub into the exhaust port A. The exhaust ports A have a larger radial width than the annulus of the rotor 30 covers to provide the flow passages 60 and 61 into the exhaust.

It is recognized that in a practical embodiment of our invention there will be some degree of high pressure leakage. Some of this fluid leakage will be into the area in the center of the hub 42 and some of the leakage will be into the area between the shroud 44 and the rotor housing 57. In order to rapidly extract this leakage fluid from both the inner and outer portions of the rotor, the exhaust port A at the stator 41 is enlarged at both the inner and outer circumference to be larger than the cross-section of the channel 35 as seen in FIGURES 2 and 2a. Thus, the port A serves to exhaust or vent the spacing between the shroud 44 and the rotor housing 57 as well as the space within the hub 42 to thereby remove the compressed air which leaks from the rotor 30 or compressed air pick-up port D into these two areas.

In the foregoing, we have described our invention only in connection with preferred embodiments thereof. Many variations and modifications of the principles of our invention within the scope of the description herein are obvious. Accordingly, we prefer to be bound not by the specific disclosure herein, but only by the appending claims.

We claim:

1. An aero-dynamic wave machine comprised of a rotor, a first and second stator plate; said first and second stator plate being located at opposite ends of said rotor; said rotor comprised of a hub, a plurality of blades and a shroud; said plurality of blades attached to said hub and said shroud to define a plurality of channels in said rotor; said first stator plate containing an air intake port and a pick-up port, said second stator plate containing a nozzle port and an exhaust port; said air intake port, said pick-up port and said nozzle port all having a radial depth substantially equal to the radial depth of said plurality of channels; said exhaust port having a radial depth larger than the radial depth of said channels.

2. The device of claim 1 wherein said exhaust port extends beyond both the inner and outer radial boundaries of said plurality of channels.

3. The device of claim 2 wherein said aero-dynamic wave machine contains a housing; leakage fluid in the space between said shroud and said housing as well as leakage fluid within said hub passes to said exhaust port as a result of its radial depth being larger than the radial depth of said channels.

References Cited in the file of this patent

UNITED STATES PATENTS

| | | |
|---|---|---|
| 875,644 | Barth | Dec. 31, 1907 |
| 1,014,683 | Westinghouse | Jan. 16, 1912 |
| 1,072,457 | Herr | Sept. 9, 1913 |
| 1,270,232 | Steenstrup | June 18, 1918 |
| 1,307,082 | Dahlstrand | June 17, 1919 |
| 1,398,461 | Kerr | Nov. 29, 1921 |
| 1,585,713 | Herr | May 25, 1926 |
| 2,345,918 | Dahlstrand | Apr. 4, 1944 |
| 2,347,034 | Doran | Apr. 18, 1944 |
| 2,613,058 | Atkinson | Oct. 7, 1952 |
| 2,687,843 | Alcock | Aug. 31, 1954 |
| 2,696,171 | Jandasek | Dec. 7, 1954 |
| 2,766,928 | Jendrassik | Oct. 16, 1956 |
| 2,935,296 | Hockert | May 3, 1960 |
| 2,959,344 | Neidermann | Nov. 8, 1960 |

FOREIGN PATENTS

| | | |
|---|---|---|
| 317,345 | Switzerland | Dec. 29, 1956 |
| 556,204 | Canada | Apr. 22, 1958 |
| 622,626 | Great Britain | May 4, 1949 |